US012663981B1

(12) United States Patent
Thomas et al.

(10) Patent No.: US 12,663,981 B1
(45) Date of Patent: Jun. 23, 2026

(54) SECURE NON-VOLATILE FIRMWARE MEMORY CONFIGURED WITHIN A BASEBOARD MANAGEMENT CONTROLLER (BMC) SYSTEM ON A CHIP (SOC)

(71) Applicant: AMERICAN MEGATRENDS INTERNATIONAL, LLC, Duluth, GA (US)

(72) Inventors: Satheesh Thomas, Johns Creek, GA (US); David Wise, Loganville, GA (US); Balaji Nagalingam Rajendiran, Duluth, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 303 days.

(21) Appl. No.: 18/635,908

(22) Filed: Apr. 15, 2024

(51) Int. Cl.
*G06F 8/65* (2018.01)

(52) U.S. Cl.
CPC ..................................... *G06F 8/65* (2013.01)

(58) Field of Classification Search
None
See application file for complete search history.

(56) References Cited

U.S. PATENT DOCUMENTS

| | | | | |
|---|---|---|---|---|
| 10,846,113 | B1 * | 11/2020 | Trier ......................... | G06F 8/65 |
| 10,860,305 | B1 * | 12/2020 | Harland ............... | H03K 19/177 |
| 2020/0133652 | A1 * | 4/2020 | Bhimanadhuni ..... | G06F 9/4403 |
| 2020/0257518 | A1 * | 8/2020 | Liedtke ................... | G06F 8/65 |
| 2020/0326925 | A1 * | 10/2020 | Nachimuthu ............ | G06F 8/65 |
| 2021/0141626 | A1 * | 5/2021 | Ladkani .................. | G06F 8/656 |
| 2021/0357204 | A1 * | 11/2021 | Nachimuthu .......... | G06F 8/656 |
| 2022/0398320 | A1 * | 12/2022 | Maddukuri .......... | G06F 21/572 |
| 2024/0028735 | A1 * | 1/2024 | Savage ................. | H04L 9/0891 |
| 2024/0152344 | A1 * | 5/2024 | Balakrishnan ........... | G06F 8/61 |
| 2025/0231753 | A1 * | 7/2025 | Gupta ................... | G06F 9/4401 |

* cited by examiner

*Primary Examiner* — Qing Chen
(74) *Attorney, Agent, or Firm* — Newport IP, LLC; Scott Y. Shigeta

(57) ABSTRACT

The technologies described herein provide a system having nonvolatile firmware memory that is configured on the same integrated circuit as a BMC SoC. This design provides the ability to store the system firmware within the SoC to minimize or eliminate the use of complex components or specialized silicon, while minimizing the number of attack points. The disclosed techniques also improve the performance of a system by eliminating the need for a system to perform a validation of contents stored on an external memory device for each boot. Further, the disclosed techniques can allow a storage device that is internal to the SoC to use a local bus of the SoC, and mitigate or eliminate the need for an SPI bus, which is much slower than the local bus of the BMC SoC.

20 Claims, 12 Drawing Sheets

Internal NV Storage in SoC with no external SPI memory for storing firmware
External RAM Storage outside the SoC Internal NV Storage in SoC, with External SPI Storage outside the SoC for storing config settings, etc.
External RAM Storage outside the SoC

BMC CPU 111

BMC VIDEO 112

BMC PCIe 113

BMC GPIO 114

INTERNAL BMC BUS 121

FLAG 203

FW CNTL 202

MUX

OTP LOCK 201

250
PRFA 211

251
BFA 210

BMC NV STORAGE 205

BMC STORAGE DEVICE 120

120

INTERNAL BMC BUS 121

BMC USB 115

BMC I2C 116

BMC ADC 117

BMC PWM 118

RAM 301

310
SPI MEMORY DEVICE 303

FIGURE 4

Internal NV Storage in SoC without External SPI Storage outside the SoC
Internal RAM Storage inside the SoC, without External RAM Storage outside the SoC Internal NV Storage in SoC without External SPI Storage outside the SoC
Internal RAM Storage inside the SoC with additional External RAM Storage outside the SoC

FIGURE 6

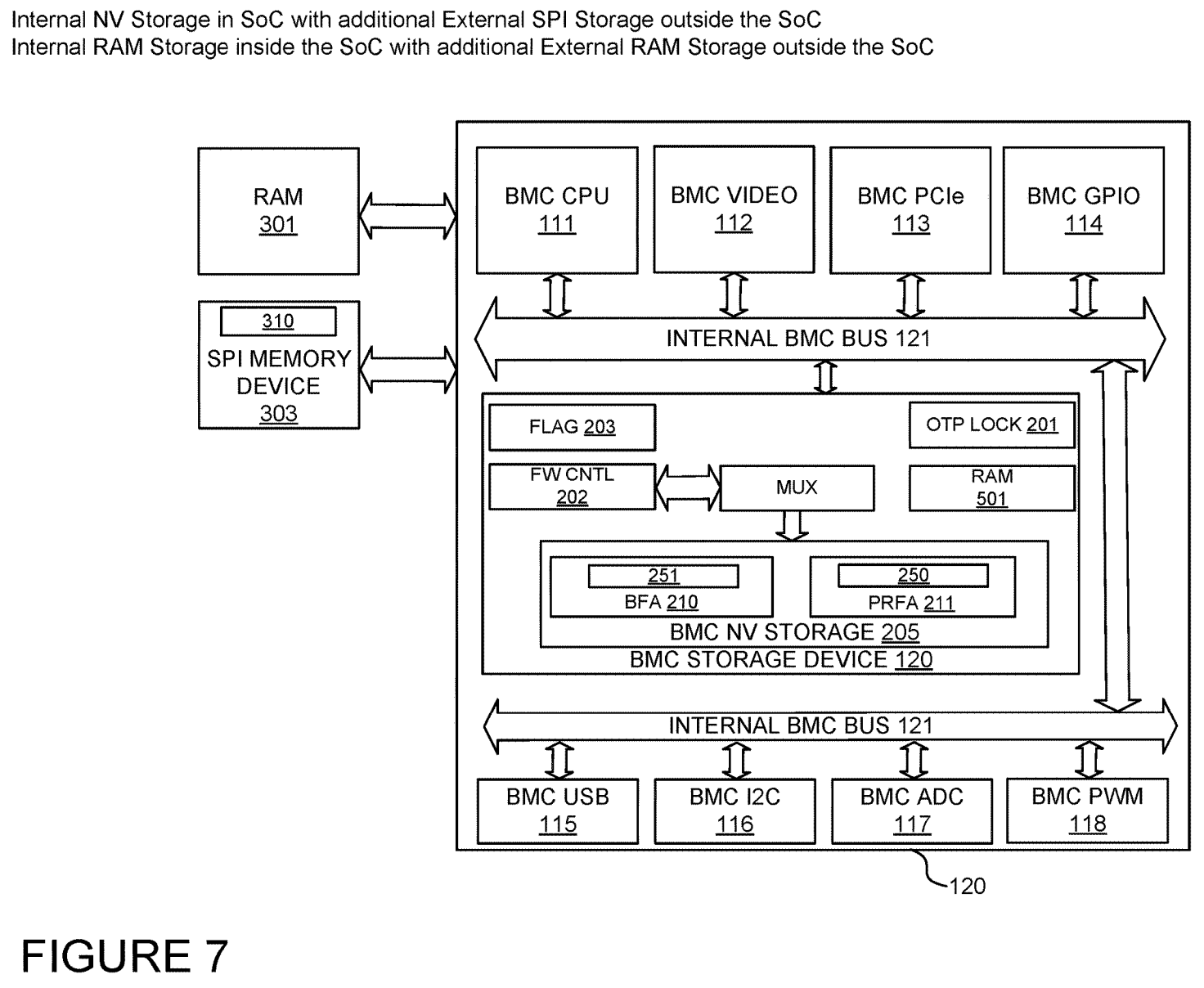

Internal NV Storage in SoC with additional External SPI Storage outside the SoC
Internal RAM Storage inside the SoC with additional External RAM Storage outside the SoC

BMC GPIO 114

BMC PCIe 113

BMC VIDEO 112

BMC CPU 111

INTERNAL BMC BUS 121

OTP LOCK 201

RAM 501

FLAG 203

FW CNTL 202

MUX

250 PRFA 211

251 BFA 210

BMC NV STORAGE 205

BMC STORAGE DEVICE 120

INTERNAL BMC BUS 121

BMC PWM 118

BMC ADC 117

BMC I2C 116

BMC USB 115

120

RAM 301

310

SPI MEMORY DEVICE 303

FIGURE 7

INITIAL PROGRAMMING AND UPDATES TO THE
BMC FIRMWARE

800

801

WRITE BOOT IMAGE FROM EXTERNAL
PROGRAMMER INTO PRFA

803

LOCK THE PRFA

805

BMC PERFORMS UPDATE AND WRITES
NEW DATA TO THE BFA OF THE BMC NV
MEMORY

807

SET THE FLAG TO INDICATE A NEW
UPDATE EXISTS FOR NEXT BOOT

BOOT OPERATION OF THE BMC

SECURE NON-VOLATILE FIRMWARE MEMORY CONFIGURED WITHIN A BASEBOARD MANAGEMENT CONTROLLER (BMC) SYSTEM ON A CHIP (SOC)

BACKGROUND

The security of computing system platforms is commonly based on ensuring that platform firmware is not tampered with, such that only the original firmware code from the platform manufacturer will be executed when a platform is powered on. Verification of the originality of platform firmware is typically performed using public key cryptography: platform firmware is signed with a private key that is kept secret by the manufacturer of the firmware and the originality of the firmware is verified each time the platform is powered on making use of a public key that is fused in a one-time programmable memory. In a system such as this, the public key constitutes a hardware Root of Trust ("RoT"), which might be referred to herein as a "HRoT," and is the start of a chain of trust that leads to the creation of a secure execution environment for an operating system and other applications executing on the platform.

Although the above-described techniques provide a number of technical benefits, there are still a number of potential shortcomings. For example, when it comes to security, the design of some existing systems have a number of potential attack points. This can be from an arrangement where a System on a Chip (SoC) is configured to interact with an external memory device that is used to store the firmware. When a person has physical access to the device, they can modify the contents of the external memory device after the validation process. This essentially bypasses the validation security measure and enables unauthorized modifications that can compromise the operation and security of the system.

The existing systems may also introduce a number of performance inefficiencies. For example, when it comes to boot performance, the existing techniques can be inefficient in that the firmware is verified each time the platform is powered on. This requires a substantial amount of time and computing resources for each boot. The verification is needed because the boot image is stored on an external device which is susceptible to tampering. In addition, other inefficiencies are caused by the fact that a serial peripheral interface ("SPI") memory device is required when memory devices are external to a BMC. A slow boot may also be caused by the use of a SPI bus and other security measures that are required when an external memory device is used for a boot image.

In addition to the above-described issues, some of the existing design choices lead to inefficiencies that increase both the cost and complexity of the platform. When a memory device that is external to an SoC is used for a boot image and/or other firmware components, a system can then require other components such as an EROT or Platform Firmware Resilience (PFR) components. These circuits also require more signal lines, more routing, and specialized silicon, and thus, lead to more costly and complex designs.

SUMMARY

The technologies described herein provide a system that stores firmware in a secure nonvolatile memory that is configured in a BMC SoC. This design provides the ability to store the system firmware within the BMC SoC to minimize or eliminate the use of complex components or specialized silicon needed for configurations utilizing an external SPI memory device, while minimizing the number of attack points. The disclosed techniques also improve the performance of a system by eliminating the need for a system to perform a validation of contents stored on an external memory device for each boot. Further, the disclosed techniques can allow the use a local bus of the BMC SoC for the firmware, and mitigate or eliminate the need for an SPI bus, which is much slower than the local bus. For illustrative purposes, memory components that are described as "configured in the BMC SoC" refer to memory components that are fabricated within the integrated circuit of the BMC SoC or memory components that are fabricated on the same chip or chiplet as the BMC SoC.

The disclosed techniques provide a number of embodiments that involve the use of a secure nonvolatile memory that is configured within a BMC SoC. The firmware of the BMC SoC is stored within the nonvolatile memory. In one embodiment, the BMC SoC configured with a secure nonvolatile memory the BMC SoC does not include a SPI memory device that is external to the BMC SoC. In such an embodiment, the nonvolatile memory can be used to store a boot image and other firmware components, such as the BMC configuration settings, etc. In another example, a controller can include a nonvolatile memory that is built in the SoC of the controller and also include the use of a SPI memory device that is external to the SoC. In such embodiments, the nonvolatile memory can be used to store particular aspects of the firmware, such as a boot image and security keys, while the external SPI memory device can be used for other content such as configuration settings, etc. As described in more detail below, these embodiments can include RAM that is configured within the SoC, and/or include RAM that is external to the SoC.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4 is a block diagram of a storage device of a BMC SoC having a secure nonvolatile memory within the SoC, the BMC configured to communicate with a RAM device that is external to the BMC SoC, the BMC configured to communicate with an external SPI storage outside the SoC.

FIG. 6 is a block diagram of a storage device of a BMC SoC having a secure nonvolatile memory and RAM configured within the SoC, the BMC also configured to communicate with a RAM device that is external to the BMC SoC, the BMC configured to operate without an external SPI storage outside the SoC.

FIG. 7 is a block diagram of a storage device of a BMC SoC having a secure nonvolatile memory and RAM configured within the SoC, the BMC also configured to communicate with a RAM device that is external to the BMC SoC, the BMC also configured to communicate with an external SPI storage outside the SoC.

DETAILED DESCRIPTION

Figure 1:
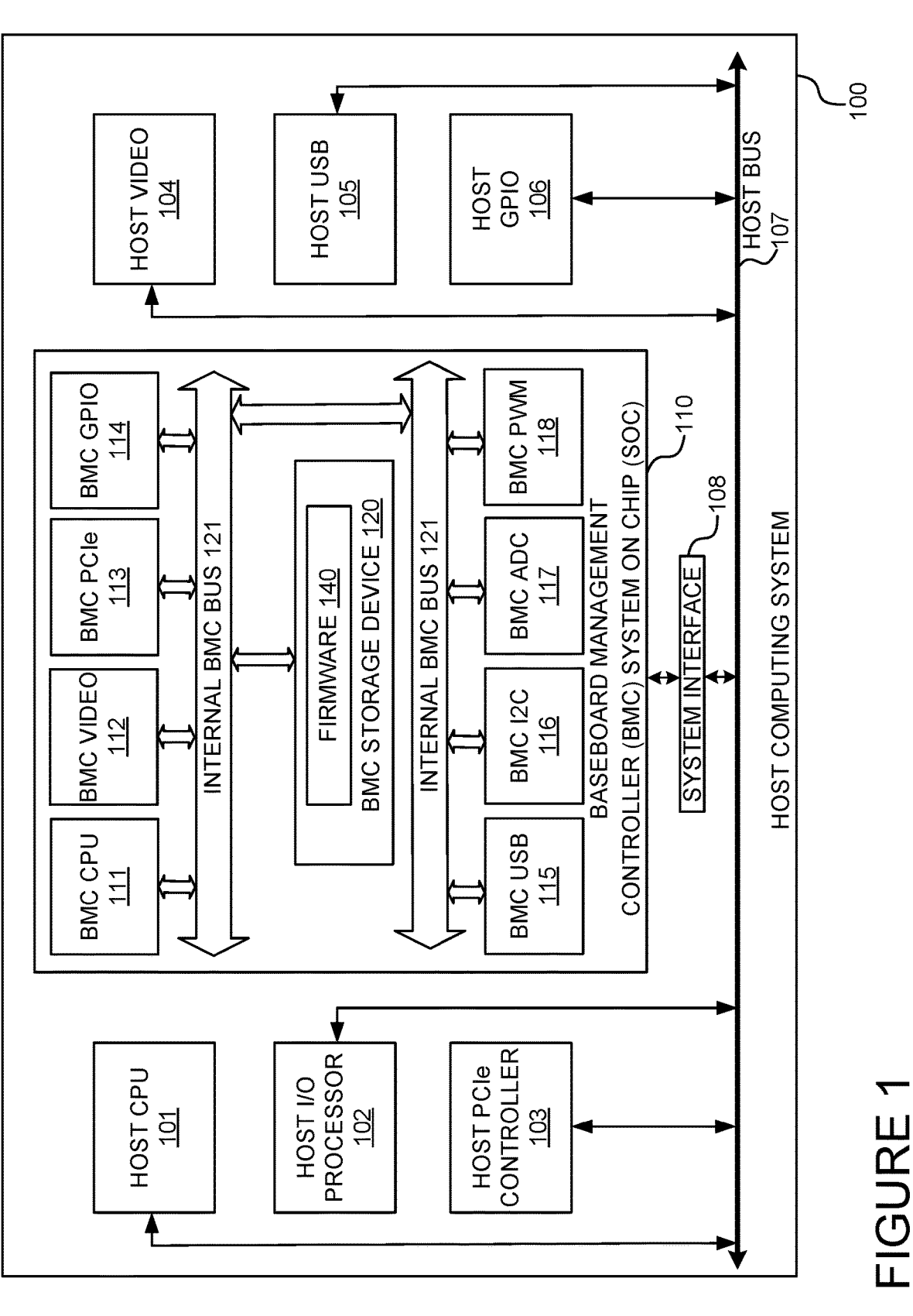
FIG. 1 is a block diagram of a host computing system that includes a BMC SoC with a secure nonvolatile memory that is configured within the SoC.

The technologies described herein provide a system having a secure nonvolatile memory that is configured within a baseboard management controller ("BMC") system on a chip (SoC). This design provides the ability to store the BMC firmware within the BMC SoC to minimize or eliminate the use of complex components or specialized silicon, while minimizing the number of attack points. The disclosed techniques also improve the performance of a system by eliminating the need for a system to perform a validation of contents stored on an external memory device for each boot.

Through implementations of the features identified briefly above, and others described herein, various technical benefits can be achieved such as, but not limited to, increased security as compared to previous systems that utilize a SPI memory device that is external to the SoC. By the use of this configuration, firmware stored in a memory device that is configured within the SoC cannot be accessed by a person who has physical access to the system. The disclosed configurations also provide reduced complexity and cost as compared to previously existing computing systems that utilize a SPI memory device that is external to the SoC. Technical benefits other than those specifically mentioned herein can also be realized through an implementation of the disclosed technologies. Additional details regarding these aspects will be provided below with regard to the FIGURES.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 2A:
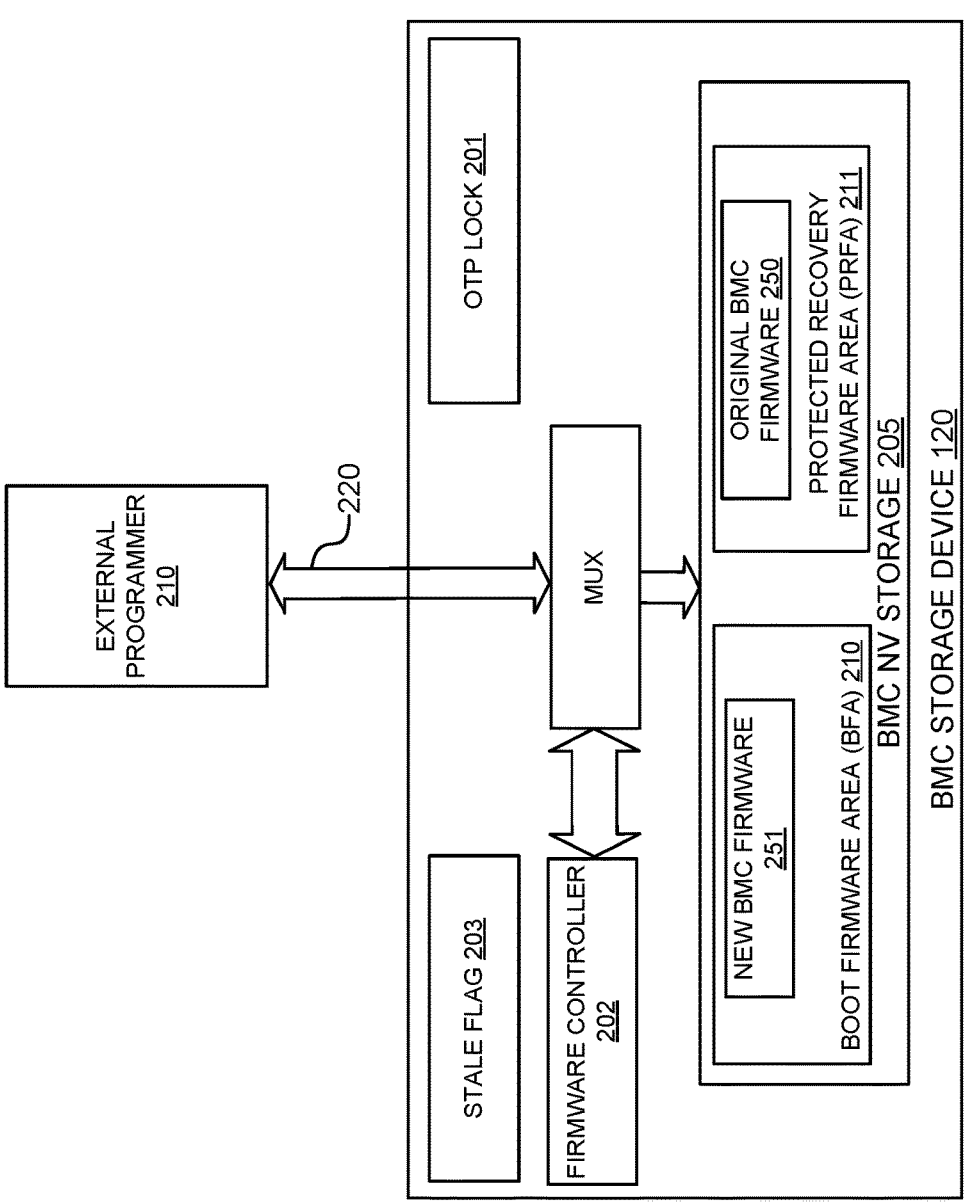
FIG. 2A is a block diagram of a storage device of a BMC SoC having a secure nonvolatile memory with a boot firmware area and a protected recovery firmware area.

As summarized above, there are a number of configurations that can utilize a storage device that is built within the SoC of a controller, such as a BMC. FIG. 1 is a block diagram of a host computing system that includes a BMC SoC with a secure nonvolatile memory that is configured within the SoC. This example shows that secure nonvolatile memory device is configured within the SoC, e.g., on the chip, chiplet, or integrated circuit as the BMC. FIG. 2A shows aspects of a storage device within the BMC SoC that contains the secure nonvolatile memory device. Then, FIGS. 3-7 show variations of different embodiments where a BMC SoC having an internal secure nonvolatile memory can interact with or without a RAM device that is external to the SoC, and interact with or without other external memory devices such as an external SPI memory device for storing select portions of the firmware.

With reference to FIG. 1, a host computing system 100 ("host computer 100" or "system 100") includes a BMC SoC 110. The host computer 100 might be implemented as a server computer, for example, with one or more host central processing units ("host CPU") 101. A host CPU 101 might include one or more processor cores.

According to various embodiments, the host CPU 101 might be a CPU from INTEL CORPORATION or ADVANCED MICRO DEVICES, INC. ("AMD"), a CPU based upon an architecture from ARM, LTD., or another type of CPU. The host CPU might communicate with other components in the host computer 100 directly or by way of a host input/output ("I/O") processor 102. In a host computer 100 utilizing an INTEL-based architecture, for example, the host I/O processor can be implemented as a Platform Controller Hub ("PCH"). Other types of host I/O processors can be used with other types of CPU architectures. The host computer 100 can include many other components, such as a host PCIe controller 103, a host video controller 104, a host USB controller 105, a host GPIO device 106, a host bus 107, etc.

The BMC SoC 110 includes a processor 111 ("BMC CPU 111"), a BMC video controller 112, a BMC PCIe controller 113, a BMC GPIO 114, a BMC USB controller 115, a BMC I2C controller 116, a BMC ADC 117, a BMC PWM 118, etc. The BMC bus 121 ("internal BMC bus 121") is used for the communication of the BMC components 111-118 and the BMC storage device 120, which includes the secure non-volatile memory used to store the BMC firmware 140. The BMC storage device 120 is configured on the same chip or chiplet as the other BMC components. The BMC bus operates independently from the host bus 107. The BMC is a stand-alone computer that operates independently from the host computer. However, the BMC SoC 110 can communicate with the host computer 110 via a system interface 108 connected to the host bus. The computing system 100 and the BMC SoC 110 can each include more or fewer components, as this example shows that the host computer and the BMC may include the same types of components but the components of the host work independently and separately from the components of the BMC.

The BMC SoC 110 can provide BMC functionality including, but not limited to, monitoring various aspects of the operational state of a computing platform like the host computer 100 using sensors, and communicating data describing the operational state of the computing platform to a management system through an out-of-band OOB network. Various types of management functionality that can be provided by the BMC SoC 110. In one specific embodiment, the BMC SoC 110 is the ASPEED 2600 from ASPEED TECHNOLOGY, INC. Other types, numbers, and configurations of processors and processor cores can be utilized in other embodiments.

As shown in FIG. 1, the BMC SoC 110 can execute firmware 140 ("BMC SoC firmware 140"), which may include a boot image, security keys, and other configuration settings for the BMC SoC. In one embodiment, the firmware 140 can be based upon the LINUX operating system. In this regard, however, it is to be appreciated that other suitable operating systems might be utilized in other configurations.

By storing the firmware 140 on a storage device 120 within the BMC SoC, the boot image, the security keys and other settings for the BMC are secured safely within the integrated circuit of the BMC. This architecture prevents any exposure that comes from a design where the firmware is stored on a device that is external to the BMC SoC chip, which can allow a person to alter the firmware after the system runs a validation process.

FIG. 2A illustrates aspects of the BMC storage device 120. As shown, the BMC storage device 120 includes a one-time programmable lock 201 ("OTP lock 201"), a firmware controller 202, a stale flag 203, a non-volatile memory device 205 (also referred to herein as a "BMC NV storage 205"), and other support components such as a MUX, which is used to control the communication of data within the storage device. The BMC NV storage 205 contains two sections: a boot firmware area 210 ("BFA 210") and a protected recovery firmware area 211 ("PRFA 211").

Figure 2B:
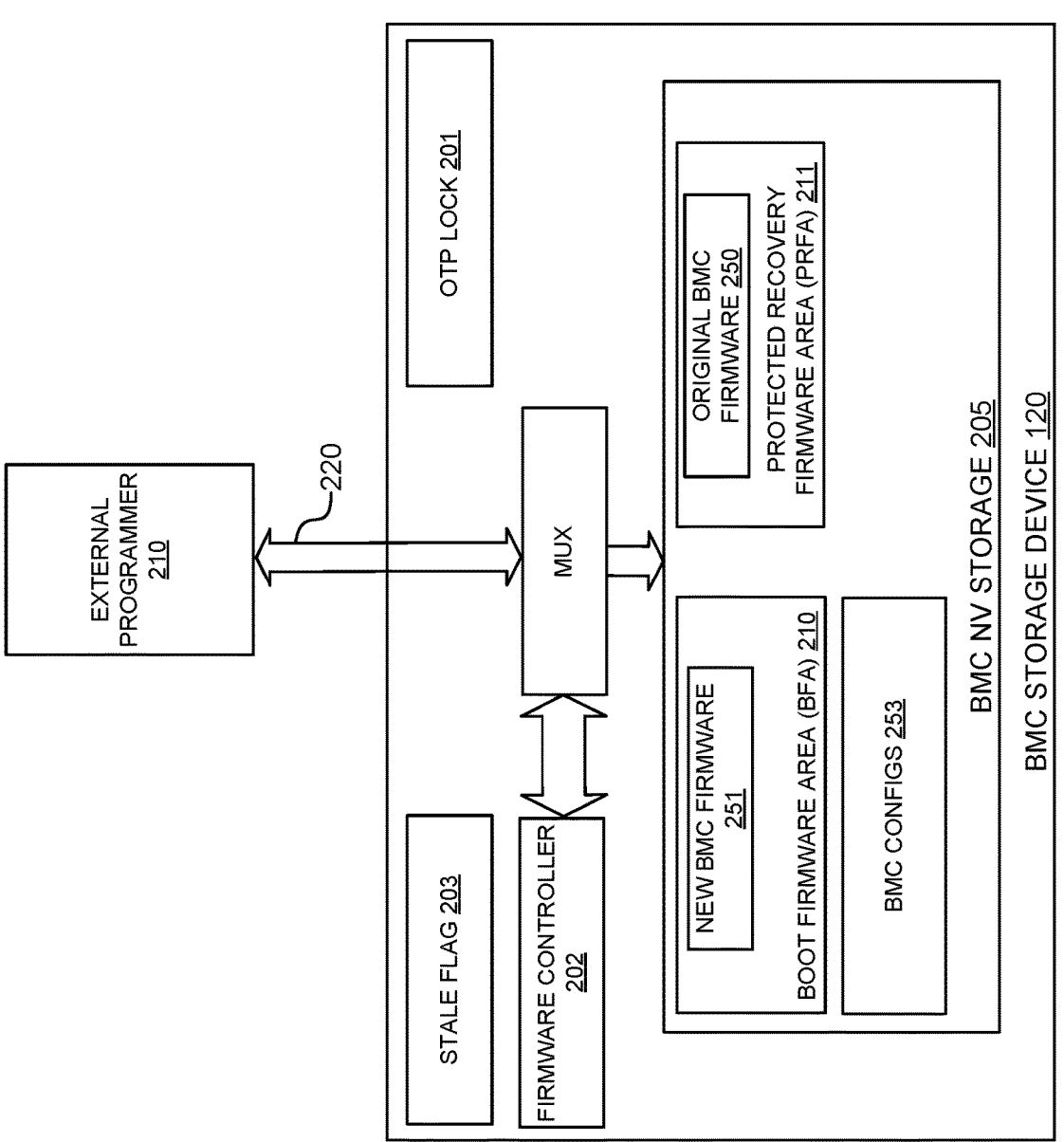
FIG. 2B is a block diagram of a storage device of a BMC SoC having a secure nonvolatile memory with a boot firmware area, a protected recovery firmware area, and another area for storing BMC configuration data.

FIG. 2B is a block diagram of a storage device of a BMC SoC having a secure nonvolatile memory with a boot firmware area, a protected recovery firmware area, and another area for storing BMC configuration data ("BMC configs 253"). The BMC configs 253 stores data that is used for configurations of the BMC and logs for events for the BMC. The BMC configs 253 are not updated in the firmware update process.

The OTP lock 201 is configured to control write access to the PRFA 211 of the BMC NV storage 205. For example, when an external programmer 210 is connected to the BMC storage device 120, the OTP lock 201 only allows the external programmer 210 to write to the PRFA 211 of the BMC NV storage 205 one time. Alternatively, the OTP lock 201 allows the programmer 210 to write firmware code to the PRFA 211 until a lock command is executed, which irreversibly locks the PRFA 211 and prevents any other modifications to the firmware stored in the PRFA 211. Once the PRFA 211 is locked, all write requests to the PRFA 211 from any external programmer are prevented. In this example, the external programmer 210 communicates with the BMC NV storage 205 via a programmable interface 220, which can be a SPI programmable interface, a proprietary a proprietary interface, or any other suitable interface. The OTP lock 201 does not apply a lock to the BFA 210, as the BFA is only configured to be modified by the BMC during an update process that utilizes security keys to validate a new version of the firmware.

In one example, the firmware may be written to the PRFA from the external programmer 210 by a manufacturer of the BMC, where the external programmer 210 configures the PRFA 211 of the BMC NV storage 205 with a secure boot image 250. The secure boot image 250 is configured to independently boot the BMC. Once this write and a lock of the firmware has been performed, any programmer that is connected to the BMC NV storage 205 via the interface 520 is restricted from writing any content to the BMC NV storage 205. From that point, the any updates to the BMC NV storage 205 can only be performed by the BMC, and new BMC firmware 251 is only stored in the BFA 210.

In some embodiments, the PRFA 206 can be configured to include a minimal image (also referred to herein as the "image") that can boot the system in case something becomes corrupt. This can be configured by the external programmer, which may be restricted to a one-time write. Once the PRFA 211 is locked by the OTP lock 201, the PRFA 211 will never change. The PRFA 211 is also configured to be secured in that it is not visible when the BMC SoC is booted.

The BFA 120 can be updated but it is only updated during a firmware update process that is managed by the BMC. After the update, the BFA 120 goes through its own validation. The BFA 120 has to be validated against the one-time programmable keys. The one-time programmable keys are provided during the initial configuration of the BMC SoC. Although a one-time lock is described herein, the locking mechanism can allow many writes to the PRFA until it is validated, then the initial programmer, such as a manufacturer, can then lock the PRFA.

During the programming phase, e.g., during manufacturing, a programmer can cause the storage of the firmware in a first section of the non-volatile memory device, e.g., in the PRFA. An irreversible lock can be applied to the first section of the non-volatile memory device to prevent any changes to the firmware stored on the first section of the non-volatile memory device. Once the lock is preformed, the BMC SoC is configured to boot using the firmware stored on the first section of the non-volatile memory device until a firmware update process is performed by the BMC SoC. Then, when a firmware update process is performed, the BMC stores new firmware to a second section of the non-volatile memory device, e.g., the BFA, which is separate from the first section of the non-volatile memory device. Responsive to storing the new firmware to the second section of the non-volatile memory device, the stale flag ("flag") is set. The set flag causes the BMC to validate the new firmware before the BMC uses the new firmware to boot and/or operate. A successful validation of the new firmware causes the BMC to clear the flag to allow the BMC to boot using the new firmware without requiring the BMC to perform another validation process for the new firmware. However, if the new firmware cannot be properly validated using keys that are provided in the initial configuration of the BMC SoC, e.g., during manufacturing, the BMC is configured to boot using the boot image stored in the PRFA.

This design provides for an improved boot speed since the image only needs to be verified only when the image is changed. This is an improvement over some existing systems where there is a validation of the image before each boot. In addition to the improved boot speed, design described herein can provide enhanced protection against external attacks and also save space on a circuit by not requiring other components such as an EROT or PFR. These circuits also require more signal lines and more routing, and thus, by having an internal memory for the BMC with a boot image, these extra components can be avoided. This design can also improve the boot speed and update speed as the bus inside the BMC is much faster than a bus the connects an external SPI memory device. In addition, the SPI protocol can be slower than other protocols that may be used for the memory device that is internal to the BMC. Thus, having the memory device that is internal to the BMC has enhanced performance. Also, the disclosed techniques enable a single chip design. By having the memory device on the BMC SoC, a simplified design that can save in cost and resources can be achieved.

As summarized above, the BMC can be configured with a number of different designs when it comes to the utilization of the secure nonvolatile memory within the SoC with an external SPI memory device, internal BMC RAM, and/or external RAM. FIGS. 3-7 show variations of different embodiments where a BMC SoC having an internal secure nonvolatile memory can interact with or without a RAM device that is external to the SoC, and interact with or without other external memory devices such as an external SPI memory device for storing select portions of the firmware.

Figure 3:
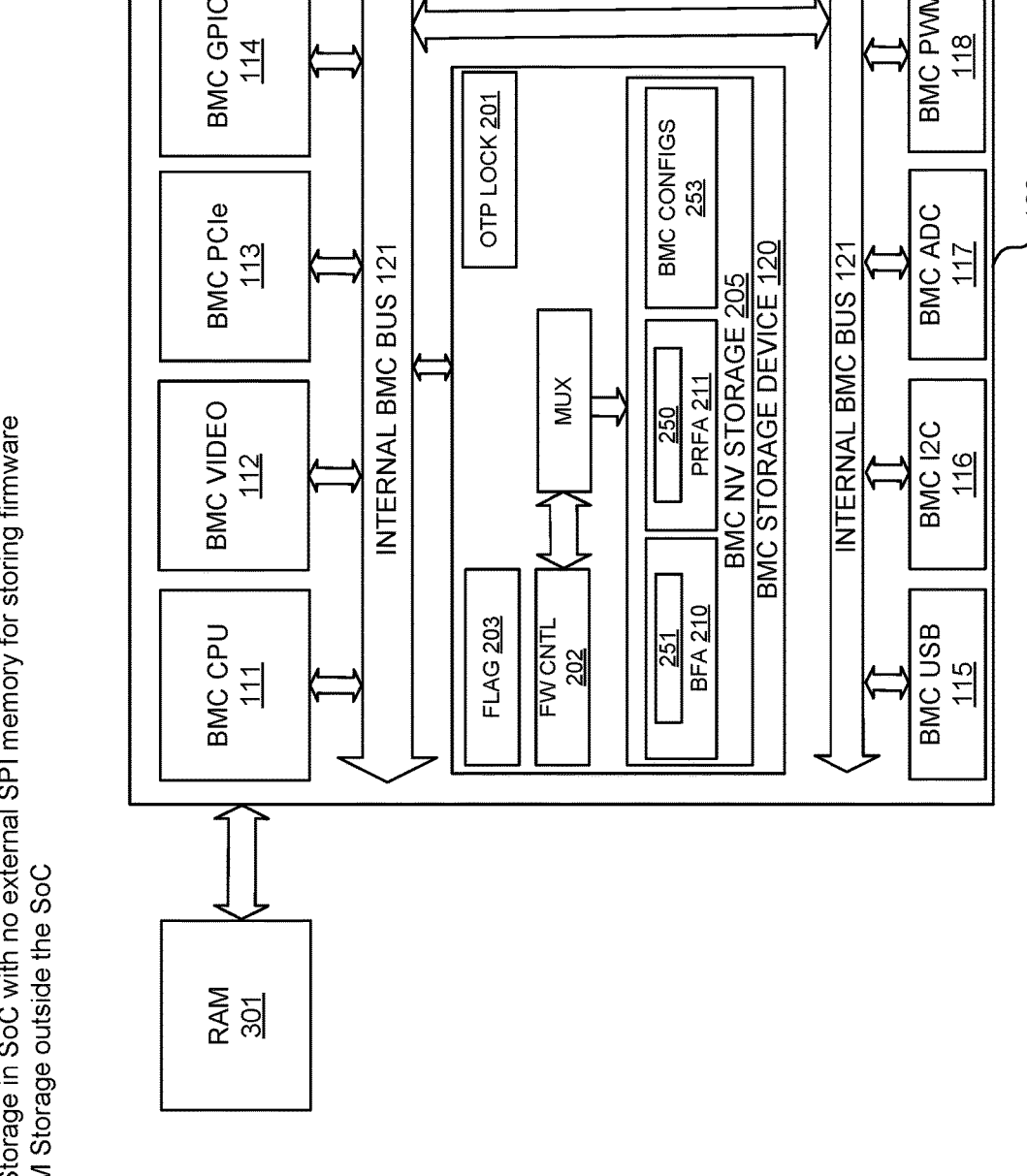
FIG. 3 is a block diagram of a storage device of a BMC SoC having a secure nonvolatile memory within the SoC, the BMC configured to communicate with a RAM device that is external to the BMC SoC.

FIG. 3 is a block diagram of a storage device of a BMC SoC having a secure nonvolatile memory within the SoC utilizing an external RAM device. In this embodiment, the BMC SoC is configured to communicate with a RAM device 301 that is external to the BMC SoC. The RAM is configured on a separate chip and communicates to the BMC using a bus or other suitable communication mechanism. This embodiment enables the BMC SoC to have the security benefits of having the BMC firmware stored in the secure nonvolatile memory within the SoC with the benefit of an external RAM device. In this embodiment, the secure nonvolatile memory includes a boot firmware area, a protected recovery firmware area, and BMC configs 253.

Figure 4:
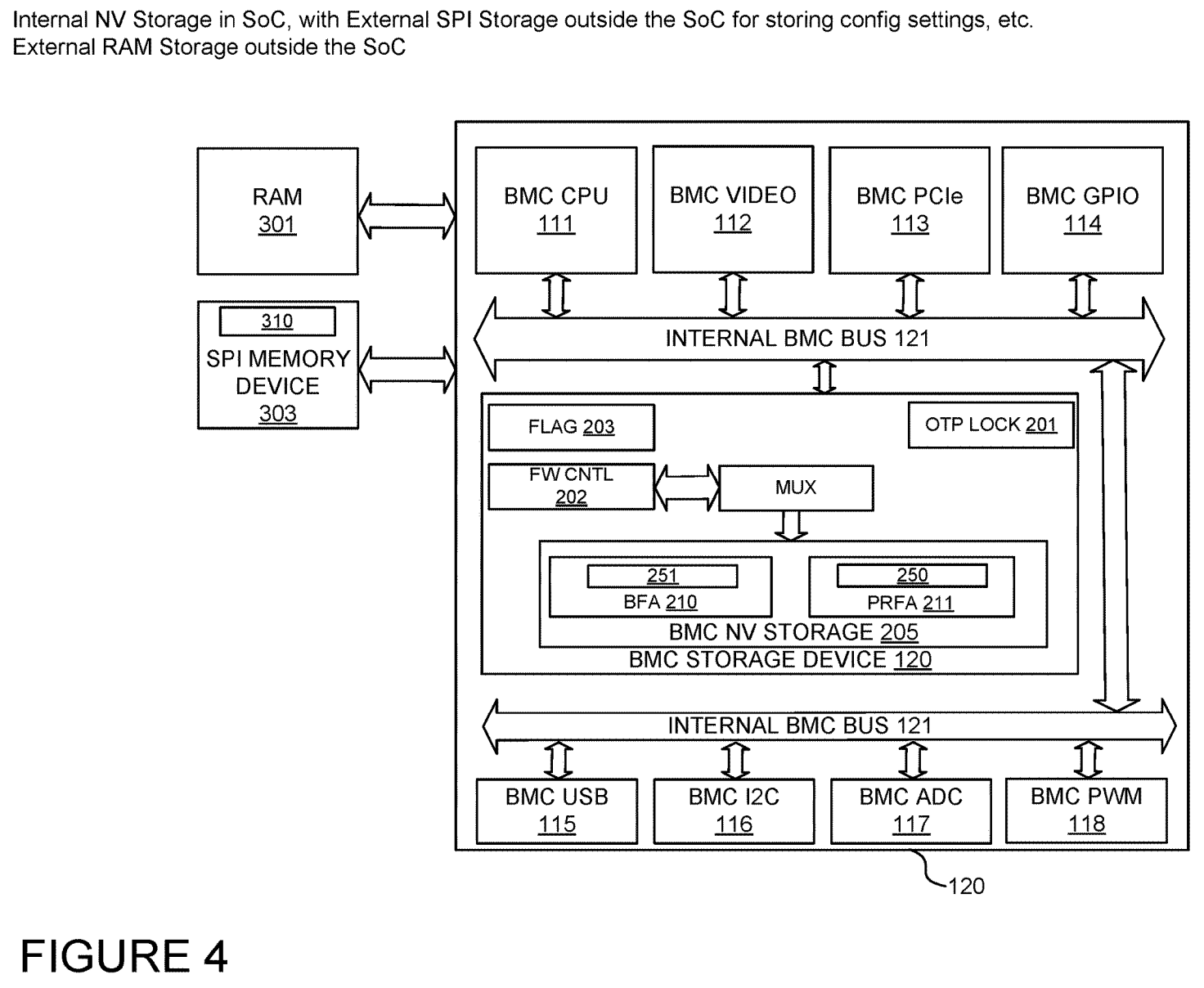

FIG. 4 is a block diagram of a storage device of a BMC SoC having a secure nonvolatile memory within the SoC utilizing an external RAM device and an external SPI storage. In this embodiment, the BMC is configured to communicate with a RAM device that is external to the BMC SoC, and the BMC is configured to communicate with an external SPI storage outside the integrated circuit of the BMC SoC. In such an embodiment, the external SPI storage can be programmed with select firmware portions 310. In some embodiments, the select portions of the firmware can include configuration settings and other functionality that does not control the boot process. This embodiment enables the BMC SoC to have the security benefits of having the BMC firmware stored in the secure nonvolatile memory within the SoC with the performance and security of an external RAM device, and the benefits of having an external SPI memory device. In embodiments where the BMC SoC is configured to communicate with the external SPI memory device, the BMC SoC can be configured with an SPI bus to communicate with the external SPI memory device and use other types of protocols to communicate with the BMC NV Storage 205. This may have performance advantages as the SPI bus maybe slower than other protocols that do not have the need for complex, secure protocols.

Figure 5:
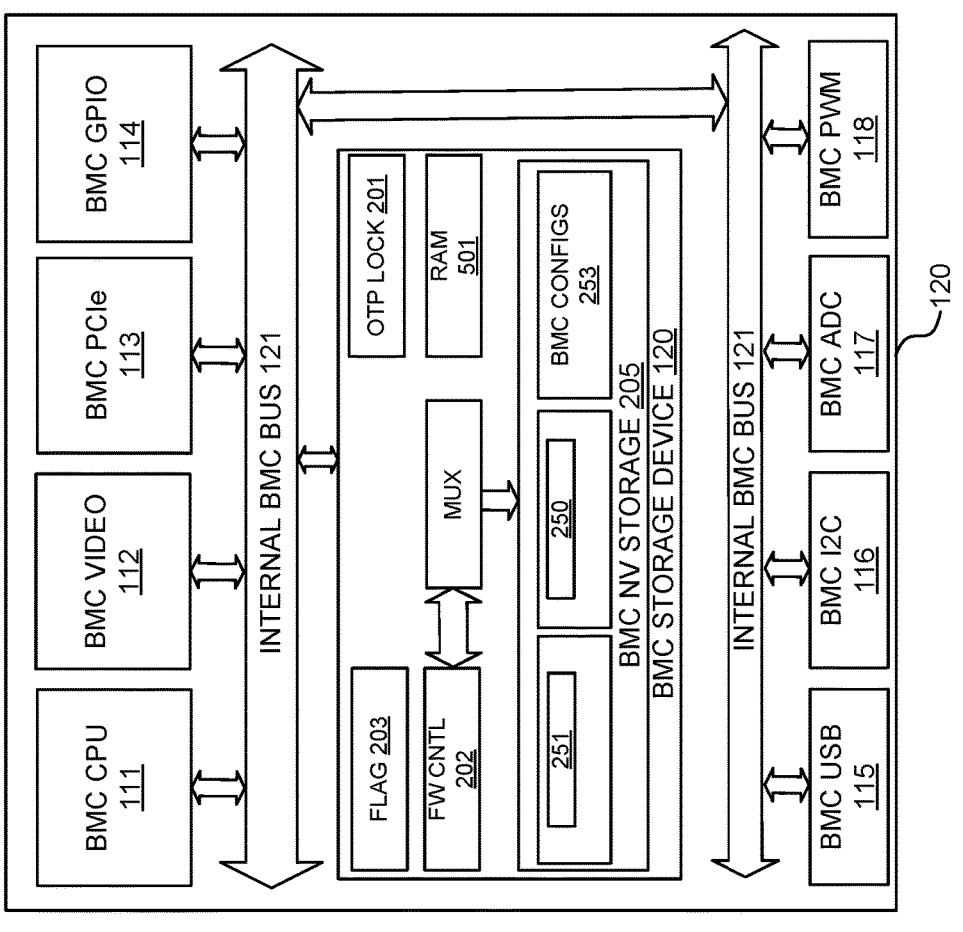
FIG. 5 is a block diagram of a storage device of a BMC SoC having a secure nonvolatile memory and RAM configured within the SoC, the BMC configured to operate without a RAM device that is external to the BMC SoC, the BMC configured to operate without an external SPI storage outside the SoC.

FIG. 5 is a block diagram of a storage device of a BMC SoC having a secure nonvolatile memory and RAM 501 configured within the SoC. This embodiment is configured to enable the operation of the BMC without an external RAM device and external SPI storage outside for increased security. This embodiment enables the BMC SoC to have the security benefits of having the BMC firmware stored in the secure nonvolatile memory within the SoC with the performance and security of internal RAM 501 that is configured in the SoC of the BMC, e.g., the RAM being configured within the same chip, chiplet, or IC of the BMC components. In this embodiment, the secure nonvolatile memory includes a boot firmware area, a protected recovery firmware area, and BMC configs 253.

Figure 6:
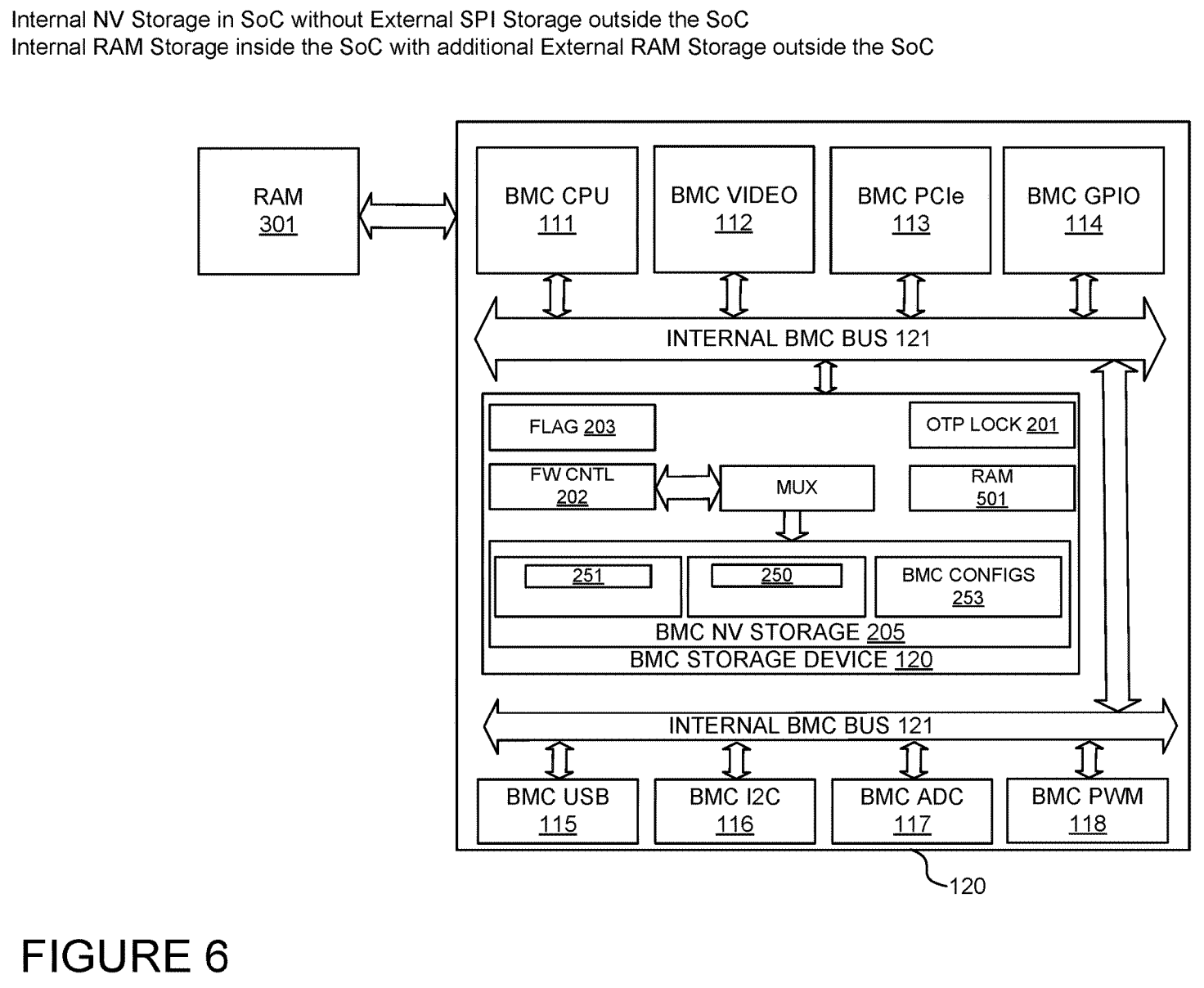

FIG. 6 is a block diagram of a storage device of a BMC SoC having a secure nonvolatile memory and RAM configured within the SoC. In this embodiment, the BMC is also configured to communicate with a RAM device that is external to the BMC SoC. This allows the BMC to leverage the speed and security of having certain content stored internally to the BMC SoC while allowing the BMC to store other types of data in an external RAM to improve scalability and design flexibility of the overall system. In this embodiment, the secure nonvolatile memory includes a boot firmware area, a protected recovery firmware area, and BMC configs 253.

FIG. 7 is a block diagram of a storage device of a BMC SoC having a secure nonvolatile memory and RAM configured within the SoC. In this embodiment, the BMC is also configured to communicate with a RAM device that is external to the BMC SoC, and also communicate with an external SPI storage outside the SoC. The external SPI storage outside the SoC can include select firmware portions 310. In some embodiments, the select portions of the firmware can include configuration settings and other functionality that does not control the boot process. The BMC NV storage 205 includes a boot image 250 and other essential or high priority firmware content. This embodiment provides the security of having select portions of the firmware stored within the SoC and select portions of other content stored in the internal RAM, while allowing the BMC to store other types of data in an external RAM and external SPI memory device to improve scalability and design flexibility of the overall system. In the embodiments of FIGS. 6 and 7, the internal RAM 501 and the external RAM 301 can be used alternatively, and may not be used concurrently. The internal RAM may be used for faster processing and the external RAM may offer more flexibility when it comes to scaling a system to meet higher demands for random access memory.

Figure 8:
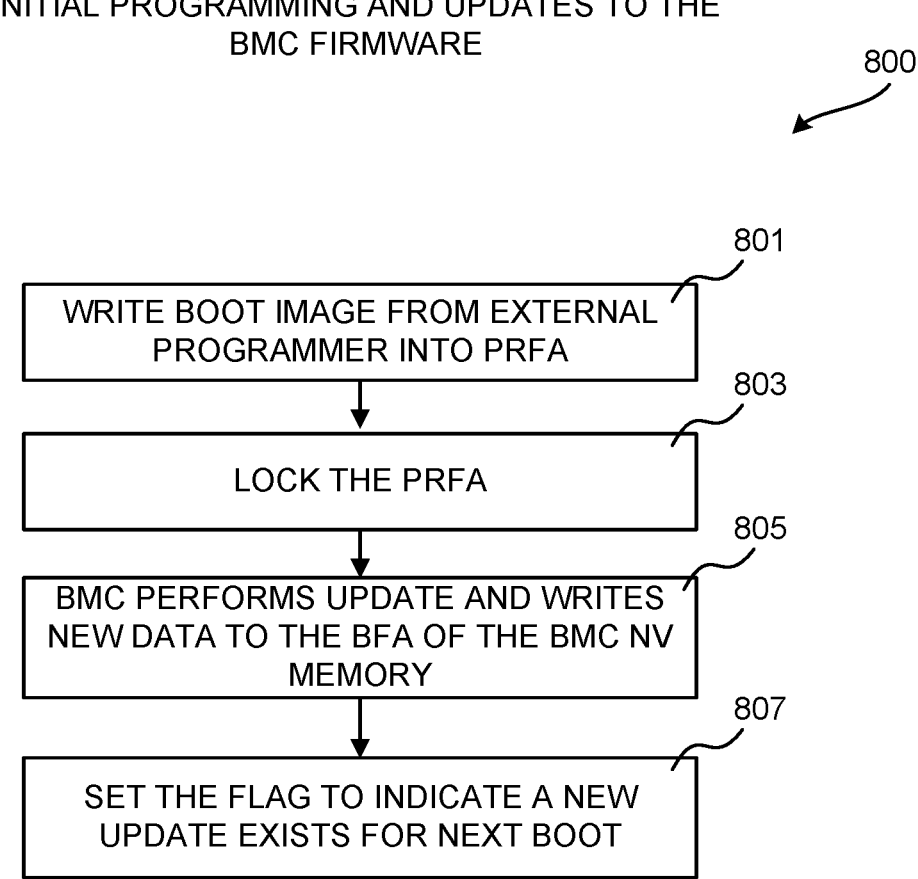
FIG. 8 is a flow diagram showing aspects of a routine for programming and updating the firmware of a BMC having a nonvolatile memory configured within the SoC.

FIG. 8 is a flow diagram showing aspects of a routine for programming and updating the firmware of a BMC having a nonvolatile memory configured within the integrated circuit of the SoC. For each routine described herein, it is to be appreciated that the logical operations described herein with respect to the figures can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 800 begins at operation 801, where the system stores the firmware received from an external programmer in a first section of the non-volatile memory device. The firmware is programmed with security keys that can be used later to validate future updates to the BMC. This first section of the non-volatile memory device can be a PRFA. This can be a write-once operation or the firmware can be written to the PRFA a number of times until a lock instruction is received.

At operation 803, in response to the operation of a one-time write locking mechanism, or a locking instruction, the system can cause an irreversible lock on the first section of the non-volatile memory device to prevent any changes to the firmware stored on the first section of the non-volatile memory device. Once locked, the BMC SoC is configured to boot using the firmware stored on the first section of the non-volatile memory device until a firmware update is performed by the BMC SoC.

At operation 805, the BMC performs an update and writes new data, e.g., a new firmware, to a second section of the non-volatile memory device that is separate from the first section of the non-volatile memory device. In some embodiments, the second section of memory is a BFA that is the only component of the BMC to store new firmware received from a firmware update process.

At operation 807, responsive to storing the new firmware to the second section of the non-volatile memory device, the stale flag is set to cause the BMC to validate the new firmware prior to the next boot of the BMC. Thus, after the update, when the BMC boots, the BMC will validate the new firmware using the keys provided at the time of the initial configuration of the BMC SoC. A successful validation of the new firmware causes the BMC to clear the flag to allow the BMC to boot using the new firmware without requiring the BMC to perform another validation process for the new firmware.

Figure 9:
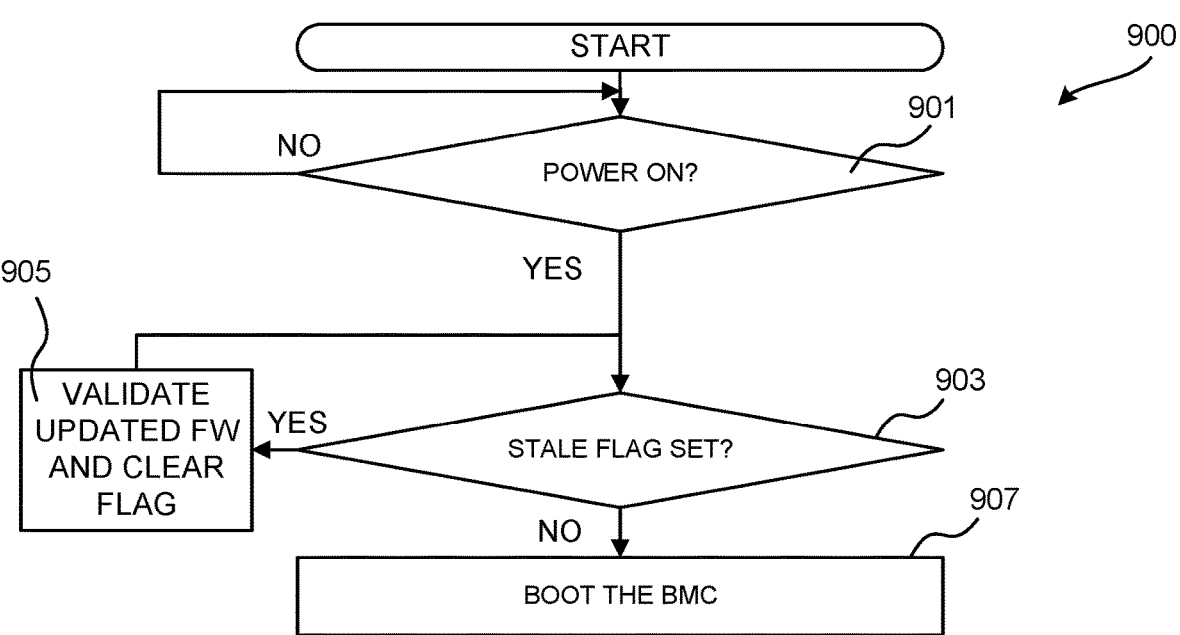
FIG. 9 is a flow diagram showing aspects of a routine for booting a BMC SoC using firmware stored in a nonvolatile memory configured within the SoC.

FIG. 9 is a flow diagram showing aspects of a routine for booting a BMC SoC using firmware stored in a nonvolatile memory configured within the SoC. At operation 901, when the system boots, the routine BMC proceeds to operation 903 where the BMC determines if the flat is set. If the flag is set, the routine proceeds to operation 905 where the BMC validates the update, e.g., the new firmware. If the flag is not set, the routine proceeds to operation 907 where the BMC boots using the new firmware.

The BMC determines if keys within the update correspond with keys provided during the initial configuration of the BMC SoC. If the validation process determines that the new firmware meets the security criteria using the keys provided during the initial configuration of the BMC SoC, the system clears the flag and allows the BMC to boot using the new firmware. However, if the validation process determines that the new firmware does not meet the security criteria using the keys provided during the initial configuration of the BMC SoC, the system does not clear the flag and the BMC is configured to boot using the original firmware stored in the PRFA.

Figure 10:
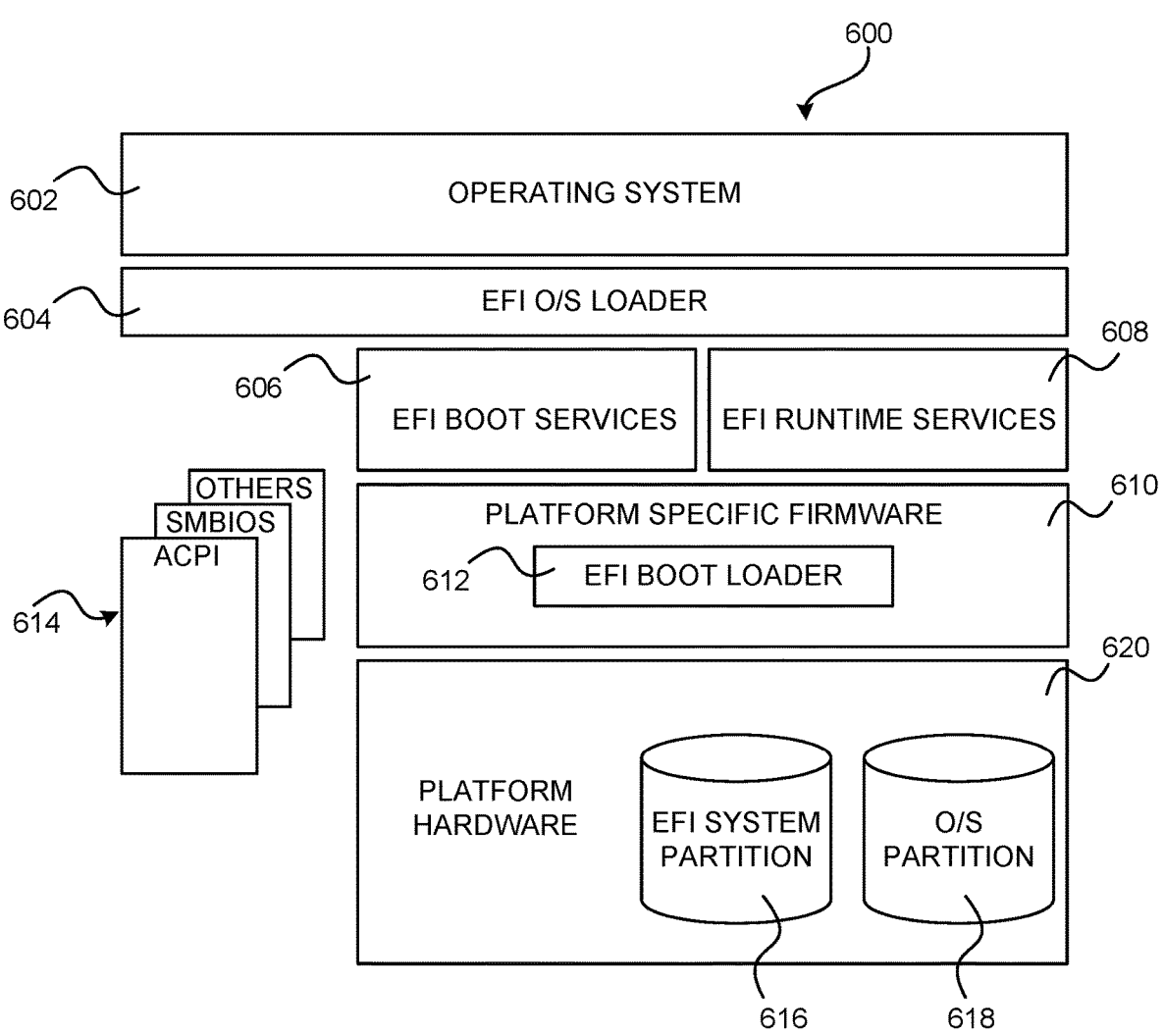
FIG. 10 is a software architecture diagram illustrating a software architecture for a unified extensible firmware interface-compliant ("UEFI") firmware that provides an operating environment for aspects of the technologies presented herein in one embodiment.

Turning now to FIG. 10, a software architecture diagram will be described that illustrates an architecture for a Unified Extensible Firmware Interface ("UEFI") Specification-compliant firmware 600 that can be configured to provide and/or utilize aspects of the technologies disclosed herein. In particular, the firmware architecture shown in FIG. 10 can be utilized to implement the host firmware 142 described above. The host firmware 142 can also be implemented in other ways in other configurations.

The UEFI Specification describes an interface between an operating system 602 and a UEFI Specification-compliant firmware 600. The UEFI Specification also defines an interface that a firmware 600 can implement, and an interface that an operating system 602 (which might be referred to herein as an "OS") can use while booting. How a firmware implements the interface can be left up to the manufacturer of the firmware. The UEFI Specification also defines a way for an operating system 602 and a firmware 600 to exchange information necessary to support the operating system boot process. The term "UEFI Specification" used herein refers to both the EFI Specification developed by INTEL CORPORATION and the UEFI Specification managed by the UEFI FORUM.

As shown in FIG. 10, the architecture can include platform hardware 620, such as that described below with regard to FIG. 11, and an operating system 602. A boot loader 612 for the operating system 602 can be retrieved from the UEFI system partition 616 using a UEFI operating system loader 604. The UEFI system partition 616 can be an architecturally shareable system partition. As such, the UEFI system partition 616 can define a partition and file system designed to support safe sharing of mass storage between multiple vendors. An OS partition 618 can also be utilized.

Once started, the UEFI OS loader 604 can continue to boot the complete operating system 602. In doing so, the UEFI OS loader 604 can use UEFI boot services 606, an interface to other supported specifications to survey, comprehend, and initialize the various platform components and the operating system software that manages them. Thus, interfaces 614 from other specifications can also be present on the system. For example, the ACPI and the System Management BIOS ("SMBIOS") specifications can be supported.

UEFI boot services 606 can provide interfaces for devices and system functionality used during boot time. UEFI runtime services 608 can also be available to the UEFI OS loader 604 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 602 and system firmware 600, the Framework is a group of specifications that together describe a firmware implementation that has been designed to perform the full range of operations that are required to initialize a platform from power on through transfer of control to the operating system 602. The specifications that make up the Framework, which are also available from INTEL CORPORATION, are also expressly incorporated herein by reference.

Figure 11:
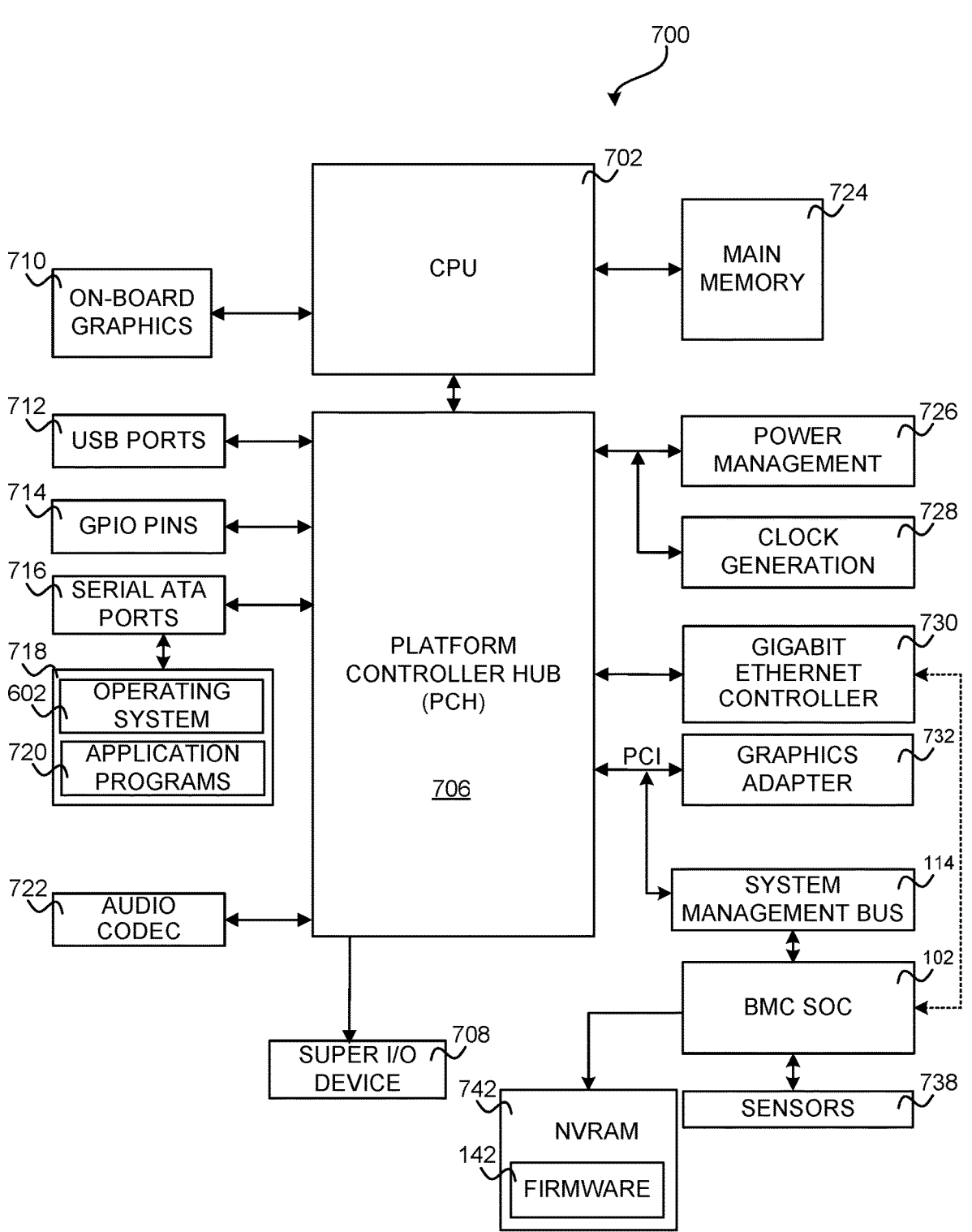
FIG. 11 is a computer architecture diagram illustrating an illustrative computer hardware and software architecture for a computing system capable of implementing aspects of the techniques and technologies presented herein.

Referring now to FIG. 11, a computer architecture diagram that shows an illustrative architecture for a computer that can provide an operating environment for the technologies presented herein will be described. For example, and without limitation, the computer architecture shown in FIG. 11 can be utilized to implement the host computer 100 and/or any of the other computing systems disclosed herein.

FIG. 11 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 11 shows an illustrative computer architecture for a computer 700 that can be utilized as a host computer 100 in the implementations described herein. The illustrative computer architecture shown in FIG. 11 includes a baseboard, or "motherboard", which is a printed circuit board to which a multitude of components or devices can be connected by way of a system bus or other electrical communication path.

In one illustrative configuration, a central processing unit ("CPU") 702 operates in conjunction with a Platform Controller Hub ("PCH") 706. The CPU 702 is a central processor that performs arithmetic and logical operations necessary for the operation of the computer 700. The computer 700 can include a multitude of CPUs 702. Each CPU 702 might include multiple processing cores.

The CPU 702 provides an interface to a random access memory ("RAM") used as the main memory 724 in the computer 700 and, possibly, to an on-board graphics adapter 710. The PCH 706 provides an interface between the CPU 702 and the remainder of the computer 700.

The PCH 606 can also be responsible for controlling many of the input/output functions of the computer 700. In particular, the PCH 706 can provide one or more universal serial bus ("USB") ports 712, an audio codec 722, a Gigabit Ethernet Controller 732, and one or more general purpose input/output ("GPIO") pins 714. The USB ports 712 can include USB 2.0 ports, USB 3.0 ports and USB 3.1 ports among other USB ports. The audio codec 722 can include Intel High Definition Audio, Audio Codec '97 ("AC'97") and Dolby TrueHD among others.

The PCH 706 can also include functionality for providing networking functionality through a Gigabit Ethernet Controller 730. The Gigabit Ethernet Controller 730 is capable of connecting the computer 700 to another computer via a network. Connections which can be made by the Gigabit Ethernet Controller 730 can include LAN or WAN connections. LAN and WAN networking environments are commonplace in offices, enterprise-wide computer networks, intranets, and the Internet.

The PCH 706 can also provide a bus for interfacing peripheral card devices such as a graphics adapter 732. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 706 can also provide a system management bus 734 for use in managing the various components of the computer 700. Additional details regarding the operation of the system management bus 734 and its connected components are provided below. Power management circuitry 726 and clock generation circuitry 728 can also be utilized during the operation of the PCH 706.

The PCH 706 is also configured to provide one or more interfaces for connecting mass storage devices to the computer 700. For instance, according to one configuration, the PCH 706 includes a serial advanced technology attachment ("SATA") adapter for providing one or more serial ATA ports 716. The serial ATA ports 716 can be connected to one or more mass storage devices storing an OS, such as OS 602 and application programs 720, such as a SATA disk drive 718. As known to those skilled in the art, an OS 602 comprises a set of programs that control operations of a computer and allocation of resources. An application program is software that runs on top of the operating system 602, or other runtime environment, and uses computer resources to perform application specific tasks desired by the user.

According to one configuration, the OS 602 comprises the LINUX operating system. According to another configuration, the OS 602 comprises the WINDOWS operating system from MICROSOFT CORPORATION. According to another configuration, the OS 602 comprises the UNIX operating system or one of its variants. It should be appreciated that other operating systems can also be utilized.

The mass storage devices connected to the PCH 706, and their associated computer-readable storage media, provide non-volatile storage for the computer 700. Although the description of computer-readable storage media contained herein refers to a mass storage device, such as a hard disk or CD-ROM drive, it should be appreciated by those skilled in the art that computer-readable storage media can be any available media that can be accessed by the computer 700.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 700.

A low pin count ("LPC") interface can also be provided by the PCH 706 for connecting a Super I/O device 708. The Super I/O device 708 is responsible for providing a number of input/output ports, including a keyboard port, a mouse port, a serial interface, a parallel port, and other types of input/output ports.

It should be appreciated that the program modules disclosed herein can include software instructions that, when loaded into the CPU 702 and executed, transform a general-purpose computer 700 into a special-purpose computer 700 customized to facilitate all, or part of, the operations disclosed herein. As detailed throughout this description, the program modules can provide various tools or techniques by which the computer 700 can participate within the overall systems or operating environments using the components, logic flows, and/or data structures discussed herein.

The CPU 702 can be constructed from any number of transistors or other circuit elements, which can individually or collectively assume any number of states. More specifically, the CPU 702 can operate as a state machine or finite-state machine. Such a machine can be transformed to a second machine, or a specific machine, by loading executable instructions contained within the program modules. These computer-executable instructions can transform the CPU 702 by specifying how the CPU 702 transitions between states, thereby transforming the transistors or other circuit elements constituting the CPU 702 from a first machine to a second machine, wherein the second machine can be specifically configured to perform the operations disclosed herein. The states of either machine can also be transformed by receiving input from one or more user input devices, network interfaces (such as the Gigabit Ethernet Controller 730), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to the technology used to implement the storage media, whether the storage media are characterized as primary or secondary storage, and the like. For example, if the storage media are implemented as semiconductor-based memory, the program modules can transform the physical state of the semiconductor main memory and/or NVRAM. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 706 can include a system management bus 734. As discussed above, when utilized to implement the host computer 100, the system management bus 114 can include a BMC SoC 102. As discussed above, the BMC SoC 102 is a microcontroller includes functionality for monitoring aspects of the operation of the computer 700. In the more specific configuration shown in FIG. 1 and described above, the management processor 128 of the BMC SoC 102 monitors health-related aspects associated with the computer 700, such as, but not limited to, the temperature of one or more components of the computer 700, speed of rotational components (e.g., spindle motor, CPU fan, etc.) within the computer 700, the voltage across or applied to one or more components within the computer 700, and the available and/or used capacity of memory devices within the computer 700. To accomplish these monitoring functions, the management processor 128 of the BMC SoC 102 is communicatively connected to one or more components by way of the system management bus 114 in some configurations.

In one configuration, these components include sensor devices 738 for measuring various operating and performance-related parameters within the computer 700. The sensor devices 738 can be either hardware or software based components configured or programmed to measure or detect one or more of the various operating and performance-related parameters.

The processor of the BMC SoC 102 functions as the master on the system management bus 114 in most circumstances, but can also function as either a master or a slave in other circumstances. Each of the various components communicatively connected to the processor of the BMC SoC by way of the system bus is addressed using a slave address. The system bus is used by the management processor of the BMC SoC to request and/or receive various operating and performance-related parameters from one or more components that are also communicatively connected to the system bus.

In another embodiment, the NVRAM 742 containing the firmware is connected directly to the PCH 706 and switched between the PCH 706 and BMC 102 through the usage of a MUX. In this embodiment, the BMC can execute only initial verification code and not perform runtime monitoring of accesses by the PCH 706 to SPI memory devices.

It should be appreciated that the functionality provided by the computer 700 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 700 might not include all the components shown in FIG. 11, can include other components that are not explicitly shown in FIG. 11, or might utilize an architecture completely different than that shown in FIG. 11.

Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A baseboard management controller (BMC) system on chip (SoC), comprising:

a BMC processor configured to execute a management functionality to provide support for a host computer; and a non-volatile memory device configured within an integrated circuit containing the BMC SoC, the non-volatile memory device configured to store a firmware for the BMC SoC, the BMC SoC configured to:

store the firmware received from an external programmer into a first section of the non-volatile memory device;

perform an irreversible lock on the first section of the non-volatile memory device to prevent any changes or updates to the firmware stored on the first section of the non-volatile memory device, wherein the BMC SoC is configured to boot using the firmware stored on the first section of the non-volatile memory device until a firmware update is performed by the BMC SoC;

receive a new firmware providing updated operations executed by the BMC;

store the new firmware to a second section of the non-volatile memory device that is separate from the first section of the non-volatile memory device; and responsive to storing the new firmware to the second section of the non-volatile memory device, set a flag to cause the BMC to validate the new firmware prior to a next boot of the BMC, wherein a successful validation of the new firmware causes the BMC to clear the flag to allow the BMC to boot using the new firmware without requiring the BMC to perform another validation process for the new firmware.

2. The BMC SoC of claim 1, wherein the first section of the non-volatile memory device includes a protected recovery firmware area that is configured to allow the firmware to be received from an external programmer until a locking mechanism applies an irreversible lock to the protected recovery firmware area, wherein the second section of the non-volatile memory device includes a boot firmware area that is configured to exclusively receive the new firmware by an update process performed by the BMC, and wherein the BMC is configured to only allow a boot using the new firmware upon performing a successful validation process of the new firmware using keys associated with the BMC SoC.

3. The BMC SoC of claim 1, wherein the BMC SoC is configured to communicate with a RAM memory device that is external to the BMC SoC, wherein the BMC SoC is configured to restrict communication with an external serial peripheral interface (SPI) memory device, and wherein the BMC SoC restricts storage of a boot image for the BMC SoC or other firmware for the BMC SoC to the non-volatile memory device.

4. The BMC SoC of claim 1, wherein the BMC SoC is configured to communicate with a RAM memory device that is external to the BMC SoC, wherein the BMC SoC is configured to communicate with an external serial peripheral interface (SPI) memory device, wherein the BMC SoC restricts storage of a boot image for the BMC SoC to the non-volatile memory device, wherein the BMC SoC restricts storage of any update containing boot functions to the non-volatile memory device, and wherein the BMC enables storage of configuration settings and non-boot firmware functions to the external SPI memory device.

5. The BMC SoC of claim 1, wherein the BMC SoC is configured to restrict communication with a RAM memory device that is external to the BMC SoC, wherein the BMC SoC is configured to restrict communication with an external serial peripheral interface (SPI) memory device, and wherein the BMC SoC restricts storage of a boot image for the BMC SoC or other firmware for the BMC SoC to the non-volatile memory device configured in a chip containing the BMC SoC.

6. The BMC SoC of claim 1, wherein the BMC SoC is configured to communicate with a RAM memory device that is external to the BMC SoC, wherein the BMC SoC is configured with a RAM module configured in a chip containing the BMC SoC, wherein the BMC SoC operates using the RAM module configured in the chip containing the BMC SoC and the RAM memory device that is external to the BMC SoC, wherein the BMC SoC is configured to restrict communication with an external serial peripheral interface (SPI) memory device, wherein the BMC SoC restricts storage of a boot image for the BMC SoC to the non-volatile memory device, and wherein the BMC SoC restricts storage of any update containing boot functions to the non-volatile memory device.

7. The BMC SoC of claim 1, wherein the BMC SoC is configured to communicate with a RAM memory device that is external to the BMC SoC, wherein the BMC SoC is configured with a RAM module configured in a chip containing the BMC SoC, wherein the BMC SoC operates using the RAM module configured in the chip containing the BMC SoC and the RAM memory device that is external to the BMC SoC, wherein the BMC SoC is configured to communicate with an external serial peripheral interface (SPI) memory device, wherein the BMC SoC restricts storage of a boot image for the BMC SoC to the non-volatile memory device, wherein the BMC SoC restricts storage of any update containing boot functions to the non-volatile memory device, and wherein the BMC enables storage of configuration settings and non-boot firmware functions to the external SPI memory device.

8. A computer-implemented method, for execution on a baseboard management controller (BMC) system on chip (SoC), wherein the BMC SoC comprises a BMC processor configured to execute a management functionality to provide support for a host computer, the BMC SoC further comprising a non-volatile memory device configured within an integrated circuit containing the BMC SoC, and wherein the non-volatile memory device is configured to store a firmware for the BMC SoC, the computer-implemented method comprising:

storing the firmware received from an external programmer into a first section of the non-volatile memory device;

performing an irreversible lock on the first section of the non-volatile memory device to prevent any changes or updates to the firmware stored on the first section of the non-volatile memory device, wherein the BMC SoC is configured to boot using the firmware stored on the first section of the non-volatile memory device until a firmware update is performed by the BMC SoC;

receiving a new firmware for an update process that is performed by the BMC;

storing the new firmware to a second section of the non-volatile memory device that is separate from the first section of the non-volatile memory device; and responsive to storing the new firmware to the second section of the non-volatile memory device, setting a flag to cause the BMC to validate the new firmware prior to a next boot of the BMC, wherein a successful validation of the new firmware causes the BMC to clear the flag to allow the BMC to perform a subsequent boot using the new firmware without requiring the BMC to perform another process for validating the new firmware.

9. The computer-implemented method of claim 8, wherein the first section of the non-volatile memory device includes a protected recovery firmware area that is configured to allow the firmware to be received from an external programmer until a locking mechanism applies an irreversible lock to the protected recovery firmware area, wherein the second section of the non-volatile memory device includes a boot firmware area that is configured to exclusively receive the new firmware by an update process performed by the BMC, and wherein the BMC is configured to only allow a boot using the new firmware upon performing a successful validation of the new firmware using keys associated with the BMC SoC.

10. The computer-implemented method of claim 8, wherein the BMC SoC is configured to communicate with a RAM memory device that is external to the BMC SoC, wherein the BMC SoC is configured to restrict communication with an external serial peripheral interface (SPI) memory device, and wherein the BMC SoC restricts storage of a boot image for the BMC SoC or other firmware for the BMC SoC to the non-volatile memory device.

11. The computer-implemented method of claim 8, wherein the BMC SoC is configured to communicate with a RAM memory device that is external to the BMC SoC, wherein the BMC SoC is configured to communicate with an external serial peripheral interface (SPI) memory device, wherein the BMC SoC restricts storage of a boot image for the BMC SoC to the non-volatile memory device, wherein the BMC SoC restricts storage of any update containing boot functions to the non-volatile memory device, and wherein the BMC enables storage of configuration settings and non-boot firmware functions to the external SPI memory device.

12. The computer-implemented method of claim 8, wherein the BMC SoC is configured to restrict communication with a RAM memory device that is external to the BMC SoC, wherein the BMC SoC is configured to restrict communication with an external serial peripheral interface (SPI) memory device, and wherein the BMC SoC restricts storage of a boot image for the BMC SoC or other firmware for the BMC SoC to the non-volatile memory device configured in a chip containing the BMC SoC.

13. The computer-implemented method of claim 8, wherein the BMC SoC is configured to communicate with a RAM memory device that is external to the BMC SoC, wherein the BMC SoC is configured with a RAM module configured in a chip containing the BMC SoC, wherein the BMC SoC operates using the RAM module configured in the chip containing the BMC SoC and the RAM memory device that is external to the BMC SoC, wherein the BMC SoC is configured to restrict communication with an external serial peripheral interface (SPI) memory device, wherein the BMC SoC restricts storage of a boot image for the BMC SoC to the non-volatile memory device, and wherein the BMC SoC restricts storage of any update containing boot functions to the non-volatile memory device.

14. The computer-implemented method of claim 8, wherein the BMC SoC is configured to communicate with a RAM memory device that is external to the BMC SoC, wherein the BMC SoC is configured with a RAM module configured in a chip containing the BMC SoC, wherein the BMC SoC operates using the RAM module configured in the chip containing the BMC SoC and the RAM memory device that is external to the BMC SoC, wherein the BMC SoC is configured to communicate with an external serial peripheral interface (SPI) memory device, wherein the BMC SoC restricts storage of a boot image for the BMC SoC to the non-volatile memory device, wherein the BMC SoC restricts storage of any update containing boot functions to the non-volatile memory device, and wherein the BMC enables storage of configuration settings and non-boot firmware functions to the external SPI memory device.

15. A host computing system, comprising:

a host processor;

a host bus; and a baseboard management controller (BMC) system on chip (SoC) that is in communication with the host bus, wherein the BMC SoC comprises:

a BMC processor configured to execute a management functionality to provide support for a host computer; and a non-volatile memory device configured within an integrated circuit containing the BMC SoC, the non-volatile memory device configured to store a firmware for the BMC SoC, the BMC SoC configured to:

store the firmware received from an external programmer into a first section of the non-volatile memory device;

perform an irreversible lock on the first section of the non-volatile memory device to prevent any changes or updates to the firmware stored on the first section of the non-volatile memory device, wherein the BMC SoC is configured to boot using the firmware stored on the first section of the non-volatile memory device until a firmware update is performed by the BMC SoC;

receive a new firmware providing updated operations executed by the BMC;

store the new firmware to a second section of the non-volatile memory device that is separate from the first section of the non-volatile memory device; and responsive to storing the new firmware to the second section of the non-volatile memory device, set a flag to cause the BMC to validate the new firmware prior to a next boot of the BMC, wherein a successful validation of the new firmware causes the BMC to clear the flag to allow the BMC to boot using the new firmware without requiring the BMC to perform another validation process for the new firmware.

16. The host computing system of claim 15, wherein the first section of the non-volatile memory device includes a protected recovery firmware area that is configured to allow the firmware to be received from an external programmer until a locking mechanism applies an irreversible lock to the protected recovery firmware area, wherein the second section of the non-volatile memory device includes a boot firmware area that is configured to exclusively receive the new firmware by an update process performed by the BMC, and wherein the BMC is configured to only allow a boot using the new firmware upon performing a successful validation process of the new firmware using keys associated with the BMC SoC.

17. The host computing system of claim 15, wherein the BMC SoC is configured to communicate with a RAM memory device that is external to the BMC SoC, wherein the BMC SoC is configured to restrict communication with an external serial peripheral interface (SPI) memory device, and wherein the BMC SoC restricts storage of a boot image for the BMC SoC or other firmware for the BMC SoC to the non-volatile memory device.

18. The host computing system of claim 15, wherein the BMC SoC is configured to communicate with a RAM memory device that is external to the BMC SoC, wherein the BMC SoC is configured to communicate with an external serial peripheral interface (SPI) memory device, wherein the BMC SoC restricts storage of a boot image for the BMC SoC to the non-volatile memory device, wherein the BMC SoC restricts storage of any update containing boot functions to the non-volatile memory device, and wherein the BMC enables storage of configuration settings and non-boot firmware functions to the external SPI memory device.

19. The host computing system of claim 15, wherein the BMC SoC is configured to restrict communication with a RAM memory device that is external to the BMC SoC, wherein the BMC SoC is configured to restrict communication with an external serial peripheral interface (SPI) memory device, and wherein the BMC SoC restricts storage of a boot image for the BMC SoC or other firmware for the BMC SoC to the non-volatile memory device configured in a chip containing the BMC SoC.

20. The host computing system of claim 15, wherein the BMC SoC is configured to communicate with a RAM memory device that is external to the BMC SoC, wherein the BMC SoC is configured with a RAM module configured in a chip containing the BMC SoC, wherein the BMC SoC operates using the RAM module configured in the chip containing the BMC SoC and the RAM memory device that is external to the BMC SoC, wherein the BMC SoC is configured to restrict communication with an external serial peripheral interface (SPI) memory device, wherein the BMC SoC restricts storage of a boot image for the BMC SoC to the non-volatile memory device, and wherein the BMC SoC restricts storage of any update containing boot functions to the non-volatile memory device.

\* \* \* \* \*